United States Patent [19]

Hosono et al.

[11] Patent Number: 4,890,865
[45] Date of Patent: Jan. 2, 1990

[54] TUBE JOINT FOR USE WITH MULTI-WALLED TUBE ASSEMBLY

[75] Inventors: Masayuki Hosono; Jun Hiramoto; Takashi Tozaki, all of Sohka, Japan

[73] Assignee: SMC Corporation, Tokyo, Japan

[21] Appl. No.: 121,841

[22] Filed: Nov. 17, 1987

[30] Foreign Application Priority Data

Nov. 18, 1986 [JP] Japan .................. 61-176988[U]
May 29, 1987 [JP] Japan ...................... 62-134186

[51] Int. Cl.⁴ .................................................. F16L 39/00
[52] U.S. Cl. ...................................... 285/133.1; 285/39
[58] Field of Search ................. 285/133.1, 137.1, 138, 285/320, 39, 239, 242

[56] References Cited

U.S. PATENT DOCUMENTS

| | | | |
|---|---|---|---|
| 263,266 | 8/1882 | Walsh | 285/133.1 |
| 2,433,602 | 12/1947 | Coss | 285/242 |
| 2,983,506 | 5/1961 | Bertsch et al. | 285/133.1 |
| 3,449,000 | 6/1969 | Kane | 285/242 |
| 3,765,728 | 10/1973 | Peruglia | 285/133.1 |
| 3,837,687 | 9/1974 | Leonard | 285/320 |
| 3,980,112 | 9/1976 | Basham | 285/133.1 |
| 4,021,062 | 5/1977 | Mariaulle | 285/39 |
| 4,240,651 | 12/1980 | Mariaulle | 285/39 |
| 4,669,757 | 6/1987 | Bartholomew | 285/138 |
| 4,696,496 | 9/1987 | de Guelis et al. | 285/133.1 |
| 4,722,558 | 2/1988 | Badoureaux | 285/242 |
| 4,796,924 | 1/1989 | Kosugi et al. | 285/39 |

FOREIGN PATENT DOCUMENTS 62-113984 5/1987 Japan .

Primary Examiner—Randolph A. Reese
Assistant Examiner—Anthony Knight
Attorney, Agent, or Firm—Burns, Doane, Swecker & Mathis

[57] ABSTRACT

A tube joint for connecting a multi-walled tube assembly, typically a double-walled tube assembly, including a plurality of tubes defining a plurality of fluid passages to an object includes a joint body having a hole for inserting the tube assembly therein and as many passages as the number of the fluid passages. A tube connector mechanism is provided for engaging the tube assembly. A coupling has a rod for being fitted into the tube assembly and a passage for communicating the tube assembly with one of the passages of the joint body. The rod has on a distal end thereof a substantially spherical projection projecting radially outwardly for being fitted in an inner surface of the tube assembly to connect the tube assembly to the coupling. The inner surface of the tube assembly and the rod are slidable with respect to each other to prevent damage to the tube assembly when it is connected to and disconnected from the tube joint.

13 Claims, 11 Drawing Sheets

TUBE JOINT FOR USE WITH MULTI-WALLED TUBE ASSEMBLY

BACKGROUND OF THE INVENTION

The present invention relates to a tube joint for use with a multi-walled tube assembly, and more particularly to a tube joint capable of joining a multiwalled tube assembly composed of a plurality of coaxial tubes for introducing and discharging a fluid, easily to a fluid-pressure-operated device such as a solenoid-operated valve, a cylinder, or the like, and of preventing the multi-walled tube assembly from being damaged at the time of connecting the same to and disconnecting the same from the tube joint.

Fluid-pressure-operated devices have widely been used to drive objects under air pressure, for example. Such a fluid-pressure-operated device has a plurality of ports for introducing and discharging air, and tubes are connected to such ports.

The tubes for introducing air into and discharging air from the ports are put together as closely as possible in order to allow the tubes to be installed in a small space and to facilitate the maintenance of the tubes. One specific tube arrangement is illustrated in FIG. 1 of the accompanying drawings. A fluid-pressure-operated device 2 has first and second ports 4, 6 defined therein and connected to respective tubes 8, 10 through first and second tube joints 12, 14. The first and second tube joints 12, 14 are threaded respectively in the first and second ports 4, 6, and the tubes 8, 10 are fitted respectively over joint tube members 16, 18 integral with the first and second tube joints 12, 14.

The tubes 8, 10 are bundled together by a string or band 20 so that they can be installed in a small space and can easily be maintained or serviced. Where a fluid-pressure-operated device such as a manifold-type solenoid-operated valve has many output ports, however, many tubes have to be connected thereto, and the entire arrangement is complex. Since the tubes are bundled together by the string or band 20 at several locations, a considerable number of steps are required to tighten all strings or bands 20. As more and more tubes are to be connected, the number of installing steps is increased, and so is the danger of interconnecting wrong ports with the tubes.

In case a fluid-pressure-operated device has many ports, it may be difficult to fasten the tubes with bands or strings dependent on the positions of the ports of the device. When a plurality of tubes are bundled by a string or a band, the pitch or distance between the tubes is so small that it will be practically difficult to connect the tubes to the tube joints in the process of joining the tubes to the device through the tube joints. The number of tube joints used is increased, resulting in an increase in the number of steps of installing the tubes.

Since the tubes and the tube joints are completely coupled to each other, the inner wall surfaces of the tubes may be damaged when the tubes are contracted and expanded due to a change in the fluid pressure in the tubes or a change in the temperature of the fluid.

SUMMARY OF THE INVENTION

It is a general object of the present invention to provide a tube joint which can join a multi-walled tube assembly composed of a plurality of coaxial tubes defining a plurality of fluid passages, easily to any of various fluid-pressure-operated devices, which is small in size, and which allows relative sliding movement between itself and the multi-walled tube assembly to avoid damage to the multi-walled tube assembly.

A major object of the present invention is to provide a tube joint for connecting a multi-walled tube assembly including a plurality of tubes defining a plurality of fluid passages to an object, the tube joint comprising a joint body having a hole for inserting the tube assembly therein and as many passages as the number of the fluid passages, a tube connector mechanism for engaging the tube assembly, and a coupling having a rod for being fitted into the tube assembly and a passage for communicating the tube assembly with one of the passages of the joint body, the rod having on a distal end thereof a substantially spherical projection projecting radially outwardly for being fitted in an inner surface of the tube assembly to connect the tube assembly to the coupling, the inner surface of the tube assembly and the rod being slidable with respect to each other.

Another object of the present invention is to provide a tube joint comprising a joint body having a hole for inserting therein a multi-walled tube assembly including a plurality of tubes defining a plurality of fluid passages, the joint body having as many passages as the number of the fluid passages, and a holder member disposed in the hole and having a step engageable with one of the tubes of the tube assembly for positioning the tube assembly and an opening for communicating one of the fluid passages of the tube assembly with one of the passages of the joint body.

The above and other objects, features and advantages of the present invention will become more apparent from the following description when taken in conjunction with the accompanying drawings in which preferred embodiments of the present invention are shown by way of illustrative example.

Figure 7:
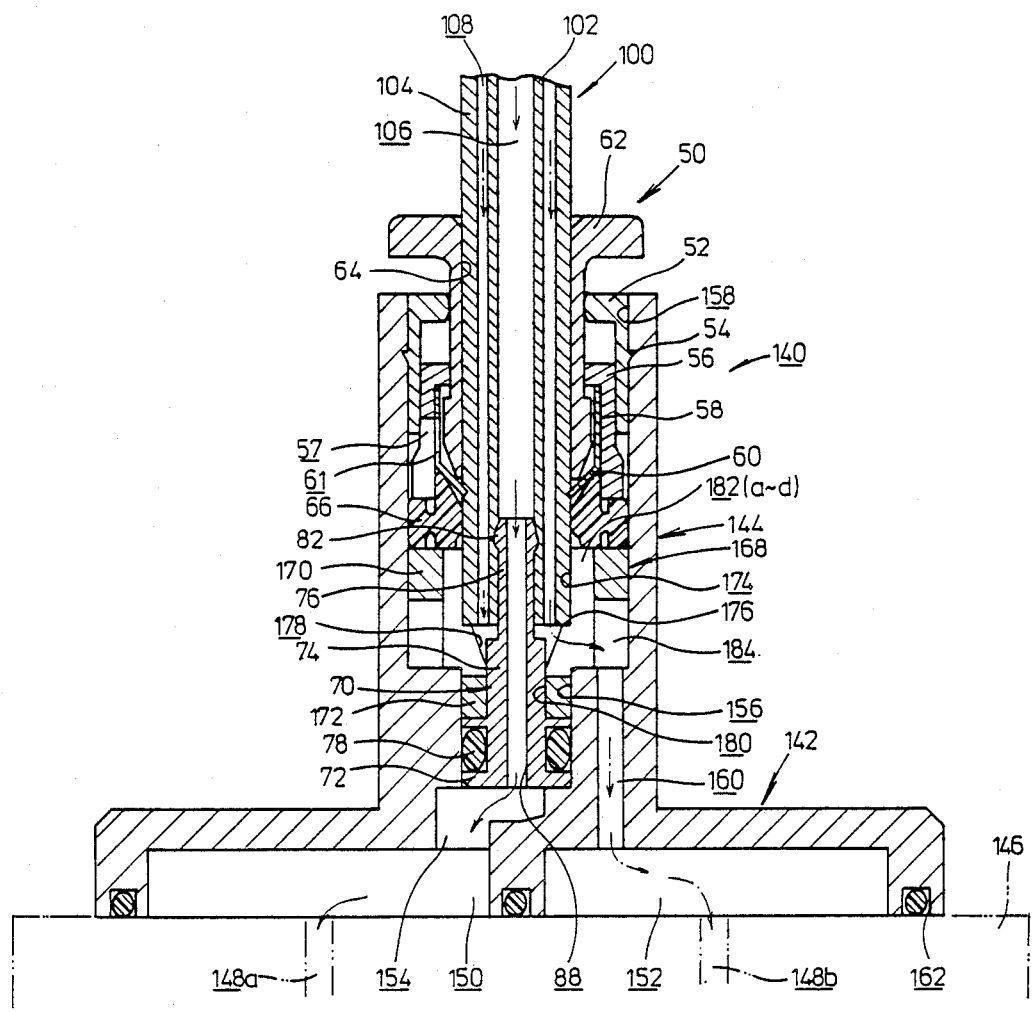
FIG. 7 is a longitudinal cross-sectional view of a tube joint for use with a multi-walled tube assembly according to a fourth embodiment of the present invention.
Figure 9:
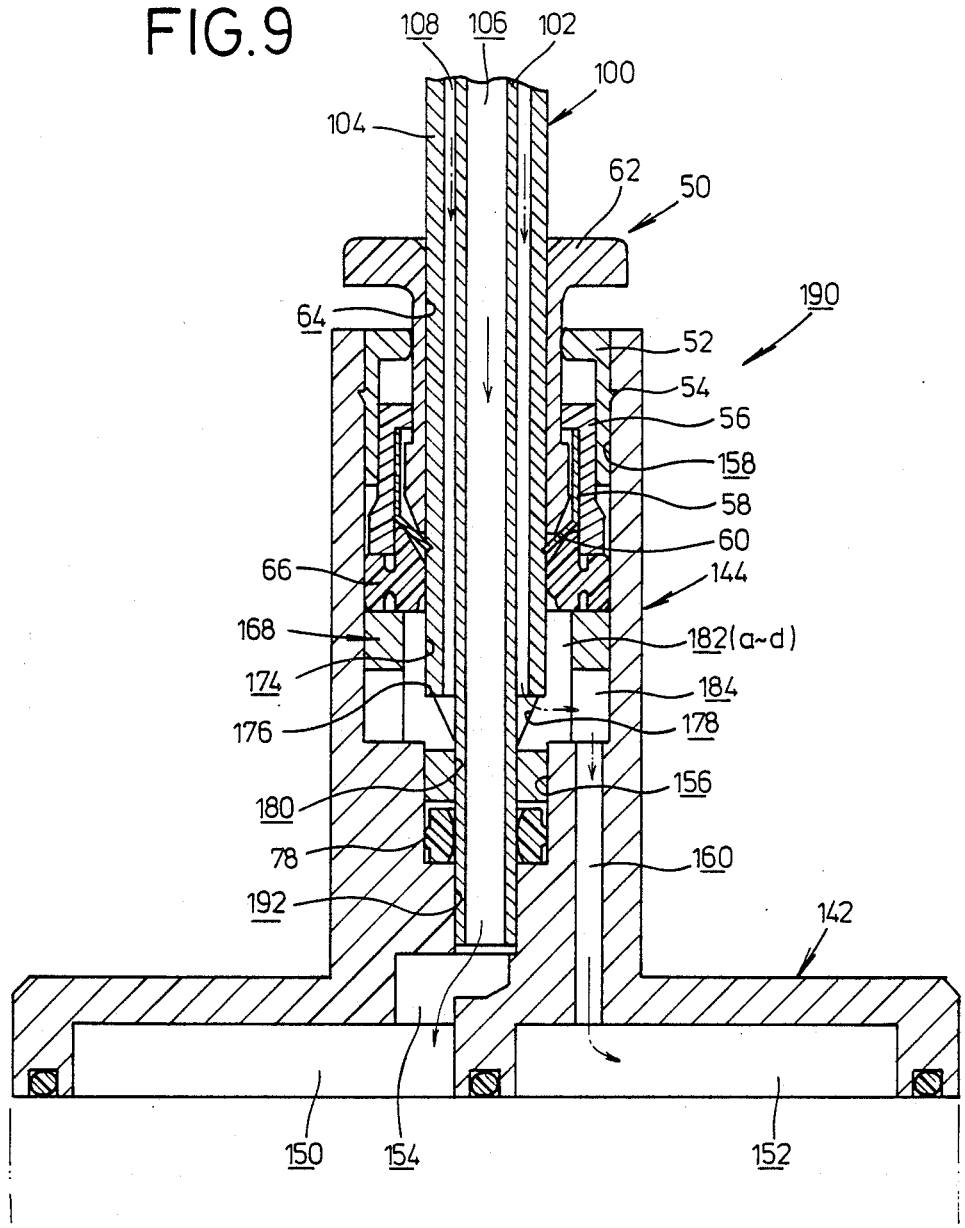
Figure 10:
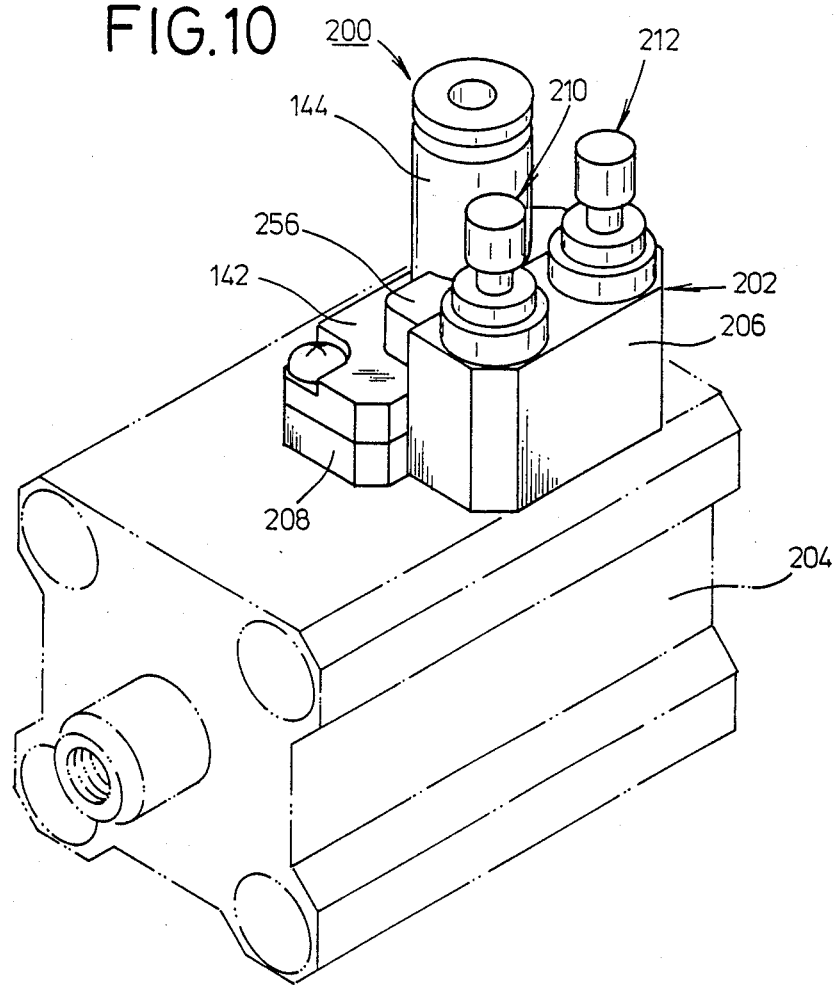
Figure 11:
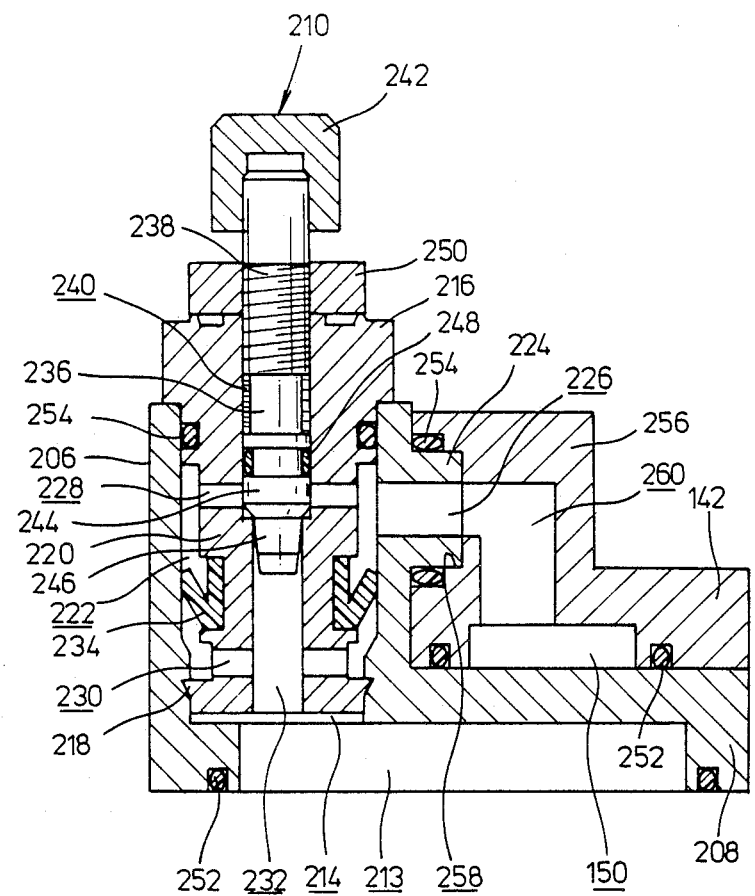
Figure 12:
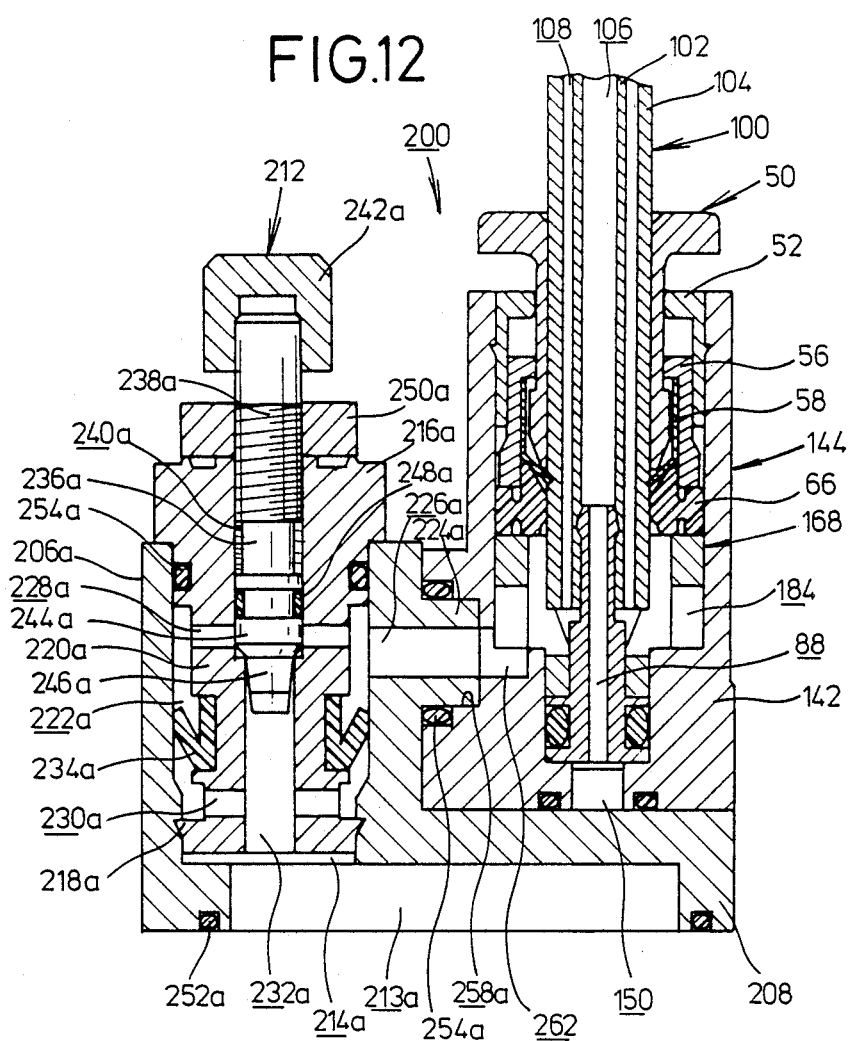

FIG..8 is a perspective view, partly cut away, of a holder member of the tube joint shown in FIG. 7;

FIG. 9 is a longitudinal cross-sectional view of a tube joint for use with a multi-walled tube assembly according to a fifth embodiment of the present invention;

FIG. 10 is a perspective view of a tube joint for use with a multi-walled tube assembly according to a sixth embodiment of the present invention, the tube joint and a speed controller being mounted on a cylinder;

FIG. 11 is a cross-sectional view of the tube joint shown in FIG. 10 and one of control valves in the speed controller; and FIG. 12 is a cross-sectional view of the tube joint shown in FIG. 10 and the other control valve in the speed controller.

DETAILED DESCRIPTION OF THE PREFERRED EMBODIMENTS

Figure 1:
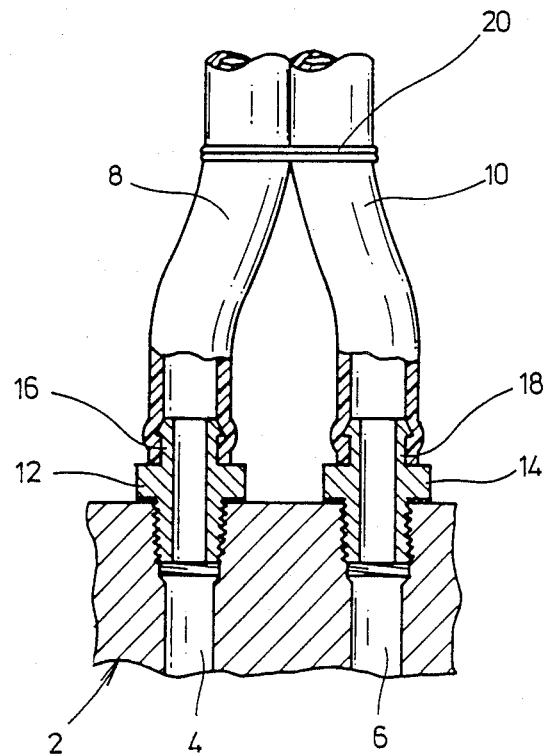
FIG. 1 is a fragmentary cross-sectional view of a conventional tube connector mechanism.
Figure 2:
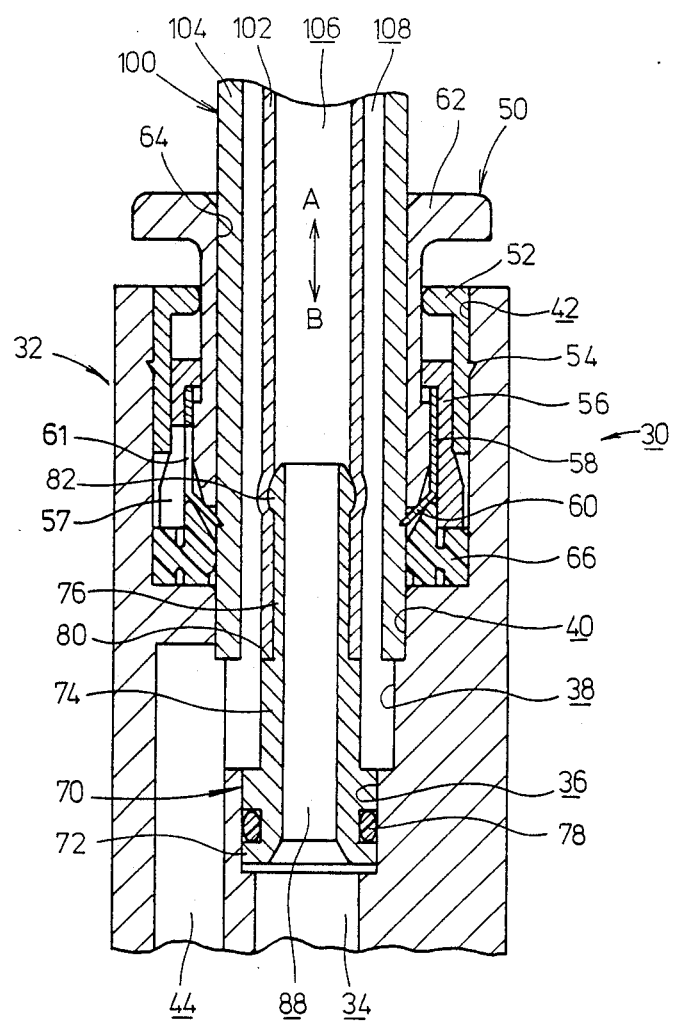
FIG. 2 is a longitudinal cross-sectional view of a tube joint for use with a multi-walled tube assembly according to a first embodiment of the present invention.
Figure 3:
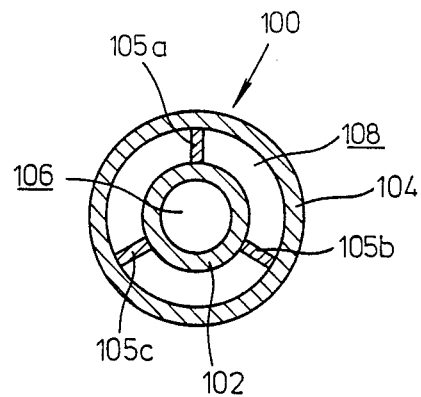
FIG. 3 is a longitudinal cross-sectional view of a multi-walled tube assembly coupled to the tube joint shown in FIG. 2.

As shown in FIG. 2, a tube joint 30 according to the present invention for use with a multi-walled tube assembly includes a tubular joint body 32 having a passage 4 and holes 36, 38, 40, 42 defined coaxially therein and successively arranged in order from a fluid-pressure-operated device (not shown), the passage 34 and the holes 6, 38, 40, 42 being of successively greater diameters in the order named. The hole 42 opens at the upper surface of the joint body 32. A passage 44 is axially defined in the joint body 32 in communication with the hole 38.

A tube connector mechanism 50 is mounted in the tubular joint body 32 for connecting the multi-walled tube assembly which may typically be a double-walled tube assembly.

The tube connector mechanism 50 includes a guide member 52 securely retained in the hole 42 of the tubular joint body 32 by an annular ridge 54 on the outer periphery of the guide member 52. A collet 56 has one end inserted in the guide member 52 and has a plurality of axial slits 7 defined in its peripheral wall. A chuck 58 fitted in the collet 56 has on one end thereof a biting edge 60 inclined at an angle in the radially inward direction. The chuck 58 also has a plurality of axial slits 61 defined in its peripheral wall for making the biting edge 60 flexible radially inwardly and outwardly. The biting edge 60 of the chuck 58 engages a release bushing 62, which when pushed in, releases the biting edge 60 from biting engagement with the double-walled tube. The release bushing 62 has an axial through hole 64 and a plurality of slits (not shown) defined in its end which is fitted in the chuck 58. A seal member 66 in the form of a ring-shaped resilient member is mounted on the radial step between the holes 40, 42, i.e., below the collet 56.

A coupling 70 coupled to the double-walled tube assembly and inserted in the holes 36 through 42 in the tubular joint body 32 will be described below.

The coupling 70 comprises a first cylindrical body 72, a second cylindrical body 74, and a rod 76 which are disposed concentrically and integral with each other and have their diameters successively reduced in the order named. The first cylindrical body 72 has a peripheral groove in which an O-ring 78 is fitted. The second cylindrical body 74 and the rod 76 define a radial step therebetween which serves as an engaging surface 80 for engaging the tip end of the double-walled tube assembly when it is connected to the tube joint 30. The rod 76 has a partly or substantially spherical projection 82 near its distal end. The coupling 70 has a passage 88 extending axially through the first cylindrical body 72, the second cylindrical body 74, and the rod 76.

The double-walled tube assembly, generally designated at 100, connected to the tube joint 30 comprises an inner tube 102 of a relatively small diameter and an outer tube 104 disposed concentrically around the inner tube 102. The inner tube 102 and the outer tube 104 are integrally joined to each other by means of a plurality of axial ribs 105a through 105c. The inner tube 102 defines an inner passage 106 therein, and the outer peripheral surface of the inner tube 102 and the inner peripheral surface of the outer tube 104 jointly define an outer passage 108 therebetween.

Operation and advantages of the tube joint 30 thus constructed will be described hereinbelow.

The coupling 70 is separate from the tubular joint body 32. First, the rod 76 of the coupling 70 is inserted into the inner passage 106 of the double-walled tube assembly 100. At this time, the partly spherical projection 82 of the rod 76 deforms the inner tube 102 radially outwardly and is securely engaged thereby, and the tip end of the inner tube 102 is held against the engaging surface 80 of the coupling 70.

The double-walled tube assembly 100 to which the coupling 70 is thus coupled is then inserted into the tube joint 30. As a result, the first cylindrical body 72 is fitted in the hole 36 of the tubular joint body 32. The outer tube 104 extends through the hole 64 of the release bushing 62 until the tip end of the outer end 104 engages the step between the holes 38, 40. By slightly pulling out the double-walled tube assembly 100, the sharp biting edge 60 of the chuck 58 which slidingly contacts the outer tube 104 bites into the outer peripheral surface of the outer tube 104 thereby to prevent the double-walled tube assembly 100 from being dislodged.

The double-walled tube assembly 100 can thus easily be coupled to the tube joint 30. The inner passage 106 of the double-walled tube assembly 100 communicates through the passages 88, 34 with a first port of an air cylinder (not shown), and the outer passage 108 communicates through the hole 38 and the passage 44 with a second port of the air cylinder.

The piston of the air cylinder is displaced in one direction in the following manner:

The opposite end of the double-walled tube assembly 100 is connected to a fluid source (not shown). When air under pressure is supplied from the fluid source into the inner passage 106 of the double-walled tube assembly 100, the air flows through the inner passage 106 into the passage 88, from which it passes through the passage 34 and the first port of the air cylinder into one chamber in the air cylinder to displace the piston (not shown) in the desired direction. Air under pressure in the other chamber in the air cylinder is forced through the second port, the passage 44, and the hole 38 into the outer passage 108 of the double-walled tube assembly 100, from which the air is discharged.

A process of displacing the piston of the air cylinder in the opposite direction is as follows:

Air under pressure is supplied from the fluid source into the outer passage 108 of the double-walled tube assembly 100 through a directional control valve (not illustrated). The air passes through the outer passage 108 and the hole 38 into the passage 44, and then reaches the second port of the air cylinder, thereby displacing the piston in the opposite direction. Air under pressure in the chamber which is being contracted by the piston is caused to flow through the first port and the passages 34, 38 into the inner passage 106 of the double-walled tube assembly 100, from which the air is discharged.

For detaching the double-walled tube assembly 100 from the tube joint 30, the release bushing 62 of the tube connector mechanism 50 is pushed into the tubular joint body 32. When the release bushing 62 is displaced into the tubular joint body 32, the biting edge 60 is spread radially outwardly. Since the biting edge 60 is now released from biting engagement with the outer tube 104, the double-walled tube assembly 100 can easily be pulled out of the tube joint 30.

A fluid under a relatively high pressure may flow through the tube joint 30 and the double-walled tube assembly 100. When such a high fluid pressure is applied to the inner passage 106, the inner tube 102 is pushed in the direction of the arrow A. Since the partly spherical projection 82 has a spherical surface, the inner wall surface of the inner tube 102 can smoothly slide against the outer surface of the rod 76 including the partly spherical projection 82. Therefore, the inner wall surface of the inner tube 102 is prevented from being damaged by the partly spherical projection 82. The inner wall surface of the inner tube 102 is also protected from damage when the inner tube 102 is slid in the direction of the arrow B until it is restrained by the engaging surface 80 while the fluid pressure in the inner passage 106 is low, or when the inner tube 102 is slid in the direction of the arrow A or B during thermal expansion or shrinkage of the double-walled tube assembly 100.

At this time, inasmuch as the biting edge 60 of the chuck 58 bitingly engages the outer peripheral surface of the outer tube 104, the outer tube 104 is prevented from being displaced in the directions of the arrows A and B, and the double-walled tube assembly 100 is effectively prevented from removal.

With the aforesaid embodiment, therefore, the double-walled tube assembly 100 can be mounted on the tube joint 30 highly easily and reliably. When the rod 76 of the coupling 70 is inserted into the inner passage 106 of the double-walled tube assembly 100, the partly spherical projection 82 on the end of the rod 76 is slidingly held against the inner peripheral surface of the inner tube 102 thus providing a hermetic seal in the inner tube 102. By then inserting the double-walled tube assembly 100 through the hole 64 of the release bushing 62, the distal end of the outer tube 104 engages and is positioned by the step between the holes 38, 40. This prevents the worker from excessively pushing the double-walled tube assembly 100 into the tube joint 30, and the double-walled tube assembly 100 can reliably and smoothly be mounted on the tube joint 30 without causing the inner tube 102 or the outer tube 104 to be forcibly flexed.

Figure 4:
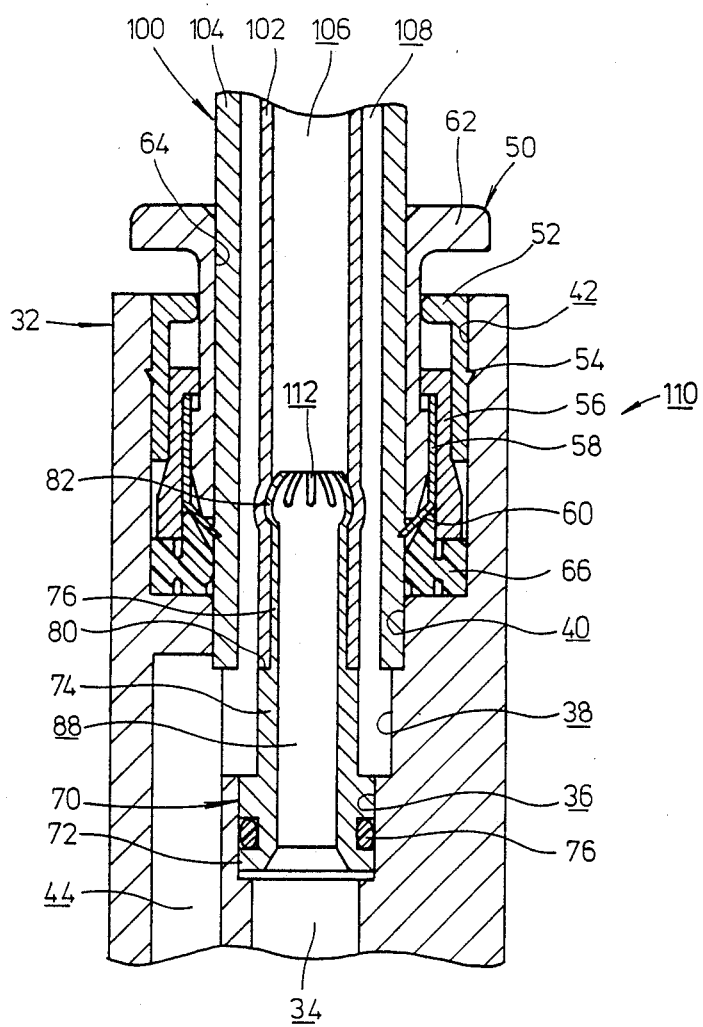
FIG. 4 is a longitudinal cross-sectional view of a tube joint for use with a multi-walled tube assembly according to a second embodiment of the present invention.

A tube joint according to a second embodiment of the present invention is illustrated in FIG. 4. Those parts of the second embodiment which are identical to those of the first embodiment are denoted by identical reference numerals, and will not be described in detail.

As shown in FIG. 2, a tube joint 110 has a plurality of slits 112 defined in the partly spherical projection 82 of the coupling 70 parallel to the axis of the tube joint 110.

In addition to the fact that the inner tube 102 and the partly spherical projection 82 are relatively slidable, the cross-sectional area of the passage 88 in the partly spherical projection 82 is substantially increased. Therefore, the fluid can smoothly flow through the region where the coupling 70 and the inner tube 102 are joined to each other.

Figure 5:
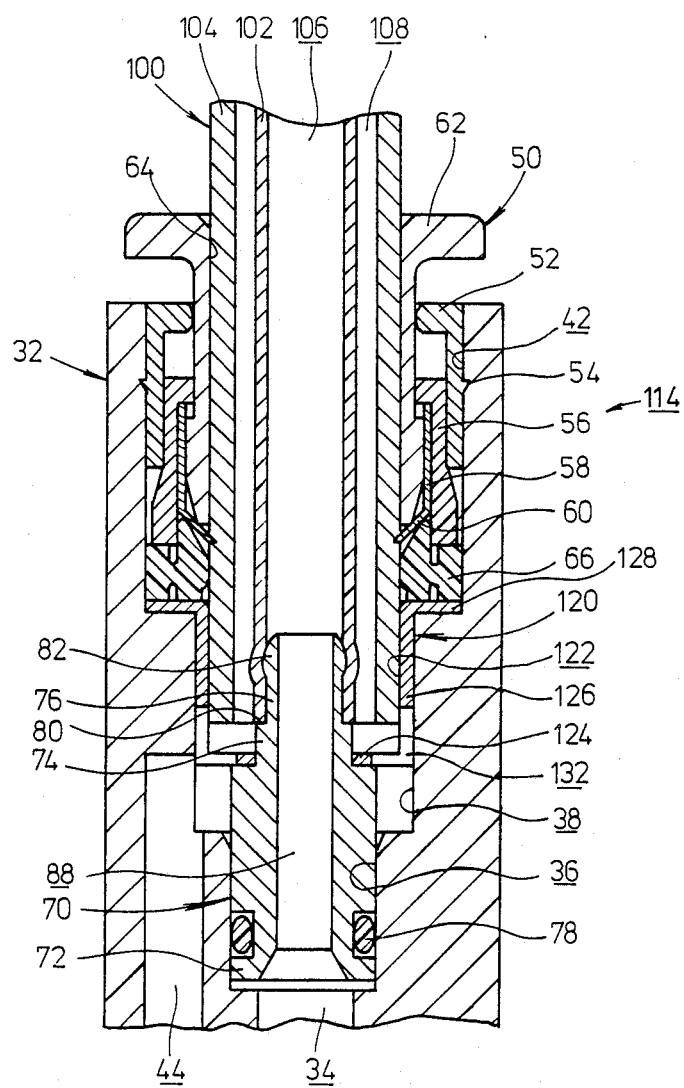
FIG. 5 is a longitudinal cross-sectional view of a tube joint for use with a multi-walled tube assembly according to a third embodiment of the present invention.

A tube joint according to a third embodiment of the present invention is shown in FIG. 5. Those parts of the third embodiment which are identical to those of the first embodiment are denoted by identical reference numerals, and will not be described in detail.

A tube joint 114 has the passage 34 and the holes 36, 38, 42 defined coaxially and successively through the tubular joint body 32 and having successively greater diameters. The first cylindrical body 72 of the coupling 70 is fitted in the hole 36.

Figure 6:
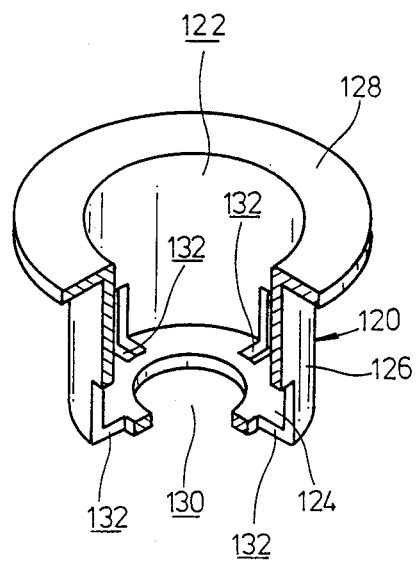
FIG. 6 is a perspective view, partly cut away, of a fixing member of the tube joint shown in FIG. 5.

A fixing member 120 for holding the coupling 70 will be described. As shown in FIG. 6, the fixing member 120 is substantially cylindrical in shape with a hole 122 defined therein and has a bottom 124, a side wall 126, and a flange 128. The bottom 124 has a hole 130 defined therein in communication with the hole 122. The fixing member 120 has a plurality of slits 132 of L-shaped vertical cross section which are defined continuously in the bottom 124 and the side wall 126.

First, the first cylindrical body 72 of the coupling 36 is fitted into the hole 36, and then the fixing member 120 is fitted into the hole 38. More specifically, the bottom 124 of the fixing member 120 is fitted over the second cylindrical body 74 of the coupling 70, which is thus prevented from being axially displaced. The fixing member 120 is securely positioned in the tubular joint body 32 by the flange 128 engaging the step between the holes 38, 42.

The tube connector mechanism 50 in the tube joint 114 is the same as the tube connector mechanism of the first embodiment except that the seal member 66 is disposed on the upper surface of the flange 128.

In the third embodiment, the double-walled tube assembly 100 is singly inserted into the tube joint 114. The outer tube 104 of the double-walled tube assembly 100 is inserted through the hole 64 of the release bushing 62 and fitted into the hole 122 of the fixing member 120. The rod 76 of the coupling 70 is inserted into the inner passage 106 of the double-walled tube assembly 100. At this time, the partly spherical projection 82 of the rod 70 deforms the inner tube 102 radially outwardly and is engaged thereby. The distal end of the inner tube 102 is held against the engaging surface 80 of the coupling 70.

The double-walled tube assembly 100 can thus easily be coupled to the tube joint 114. The inner passage 06 of the tube assembly 100 communicates with a first port of an air cylinder (not shown) through the passages 88, 34, whereas the outer passage 108 communicates with a second portion of the air cylinder through the hole 122, the slits 32, the hole 38, and the passage 44.

Since the inner tube 102 and the partly spherical projection 82 are slidable with respect to each other, the inner wall surface of the inner tube 102 is protected against damage. Moreover, the double-walled tube assembly 00 can be coupled to the tube joint 114 simply by inserting the tube assembly 100 into the tube joint 114.

FIG. 7 shows a tube joint according to a fourth embodiment of the present invention. Those parts of the fourth embodiment which are identical to those of the first embodiment are denoted by identical reference numerals, and will not be described in detail.

According to the fourth embodiment, a tube joint 140 comprises a base member 142 and a joint body 144 integral with and extending vertically upwardly from a central area of the base member 142.

The base member 142 is mounted on a cylinder 146 and has first and second openings 150, 152 defined therein and communicating respectively with first and second ports 148a, 148b defined in the cylinder 146. The first opening 150 communicates with a hole 154 of a bent cross-sectional shape which communicates with a hole 156 defined centrally axially in the joint body 144. A hole 158 of a larger diameter is defined in the joint body 144 in coaxial communication with an end of the hole 156. The hole 158 communicates with a hole 160 of a smaller diameter defined parallel to the hole 156, the hole 160 communicating with the second opening 152.

The base member 142 has a gasket groove 162 defined in its bottom in surrounding relation to the first and second openings 150, 152.

Figure 8:
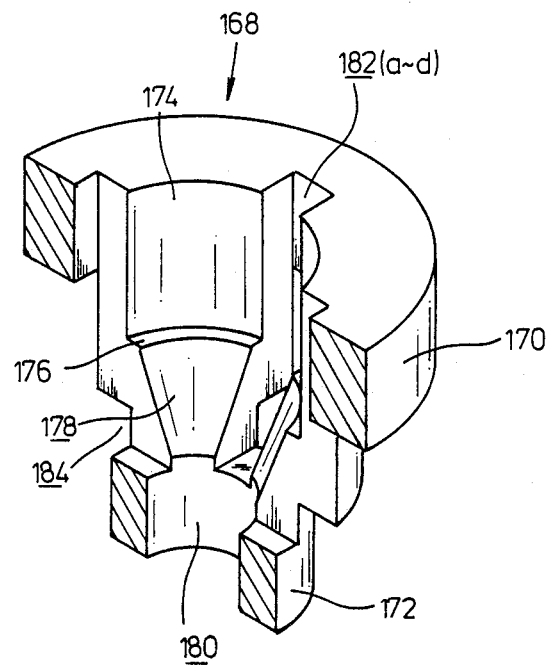

A holder member 168 is disposed in the joint body 144 in engagement with the coupling 70. As shown in FIGS. 7 and 8, the holder member 168 has a larger-diameter portion 170 fitted in the hole 158 of the joint body 144 and a smaller-diameter portion 172 disposed on one end of the larger-diameter portion 170 and fitted in the hole 156 of the joint body 144. The holder member 168 also has a first larger-diameter hole 174 defined centrally in the larger-diameter portion 170 and extending axially to a prescribed depth with a step 176 at the inner end of the first hole 174. A slanted hole 178 which is tapered toward the smaller-diameter portion 172 extends axially from a radially inner end of the step 176. The holder member 168 also has a second smaller-diameter hole 180 communicating with the distal end of the interior conical surface 178. The first hole 174 is defined by an inner peripheral surface which has defined therein a plurality of axial openings or slots 182a through 182d of a desired width that are spaced at angularly equal intervals. The slots 182a through 182d communicate with a peripheral groove 184 defined in the larger-diameter portion 170.

In the fourth embodiment, the double-walled tube assembly 100 can easily and reliably be coupled to the tube joint 140. More specifically, when the double-walled tube assembly 100 is inserted into the hole 64 of the release bushing 62 of the tube connector mechanism 50, the rod 76 of the coupling 70 is fitted into the inner tube 102. At this time, the partly spherical projection 82 on the end of the rod 76 is pressed against the inner peripheral surface of the inner tube 102 to keep the latter hermetically sealed. The distal end of the outer tube 104 engages and is positioned by the step 176 of the holder member 168. Therefore, the worker will not excessively press the double-walled tube assembly 100 into the joint body 144. The double-walled tube assembly 100 is thus reliably and smoothly joined to the joint body 144 without flexing the inner tube 102 or the outer tube 104.

When the double-walled tube assembly 100 is thus connected to the joint body 144, the inner passage 106 of the inner tube 102 communicates with the hole 154 through the passage 88 of the coupling 70, and hence with the first opening 150 of the base member 142. The outer passage 108 communicates with the hole 160 through the slots 182a through 182d of the holder member 168, and hence with the second opening 152 of the base member 142. As a consequence, the inner passage 106 of the double-walled tube assembly 100 communicates with the first port 148a of the cylinder 146, whereas the outer passage 108 communicates with the second port 148b.

The holder member 168 has the slots 182a through 182d and the peripheral groove 184 through which the outer passage 108 of the tube assembly 100 and the hole 160 of the joint body 144 communicate with each other. Consequently, it is not necessary for the joint body 144 to have a new passage which would keep the outer passage 108 and the hole 160 in communication with each other. As a result, the joint body 144 of the tube joint 140 is reduced in length, and the tube joint 140 is small in size.

The coupling 70 and the holder member 168 are slidably disposed in the holes 156, 158, respectively. Therefore, when air is supplied under pressure from the first opening 150 into the hole 154 or from the second opening 152 into the hole 160, the coupling 160 and the holder member 168 can be displaced upwardly in FIG. 7 in unison with the double-walled tube assembly 100 under the applied air pressure. Air leakage is thus prevented from occurring between the inner tube 102 and the rod 76.

FIG. 9 shows a tube joint according to a fifth embodiment of the present invention. Those parts of the fifth embodiment which are identical to those of the fourth embodiment shown in FIG. 7 are denoted by identical reference numerals, and will not be described in detail.

A tube joint 190 includes a joint body 144 having a smaller-diameter hole 192 defined therein coaxially with the holes 158, 156. The hole 192 communicates with the first opening 150 through the bent hole 154. The tube joint 190 of the fifth embodiment has no coupling.

For connection, the outer tube 104 of the double-walled tube assembly 100 is removed at its end over a certain length. The tube assembly 100 with the exposed inner tube 102 is inserted into the tube connector mechanism 50. The exposed inner tube 102 is guided by the interior conical surface 178 of the holder member 168 to enter smoothly into the second hole 180 and then into the hole 192 of the joint body 144. The inner tube 102 is hermetically sealed by the O-ring 78. The end of the outer tube 104 is engaged and positioned by the step 176 of the holder member 168. Therefore, the tube joint 190 of the fifth embodiment offers the same advantages as those of the tube joint 140 of the fourth embodiment.

A tube joint according to a sixth embodiment of the present invention will be described with reference to FIGS. 10 through 12. The tube joint, generally denoted at 200, and a speed controller 202 are mounted on an air cylinder 204.

The speed controller 202 comprises a body 206 substantially in the form of a rectangular parallelepiped, and a plate 208 integrally extending laterally from a side of the body 206. First and second control valves 210, 212 are mounted in the body 106, and the tube joint 200 is mounted on the plate 208.

As shown in FIG. 11, the first control valve 210 is mounted in a stepped through hole 214 communicating with an opening 213 defined in the bottom of the body 206. The first control valve 210 includes a joint member 216 having an annular ridge 218 on the outer periphery of the distal end thereof, the annular ridge 218 firmly engaging a peripheral surface defining the hole 214 to retain the joint member 216 in the hole 214. The joint member 216 includes a smaller-diameter portion 220 which defines an annular chamber 222 in the body 206.

The body 206 has a projecting portion 224 extending in overhanging relation to the plate 208 and having a horizontal passage 226 defined therein. The passage 226 communicates with the chamber 222. The joint member 216 has diametrical passages 228, 230 defined in upper and lower portions of the smaller-diameter portion 220.

The joint member 216 also has an axial through hole 232 communicating through the stepped through hole 214 with the opening 213 and also through the passages 228, 230 with the passage 226. The smaller-diameter portion 220 of the joint member 216 has an annular groove defined in its outer peripheral surface and in which a packing member 234 of a substantially V- shaped cross section is fitted. The packing member 234 includes a radially outer surrounding lip held against the inner peripheral surface of the hole 214 and dividing the chamber 222 into upper and lower chamber portions or sections.

The first control valve 210 is disposed in the hole 232, and has a valve body 236 with a threaded groove 238 defined in the outer peripheral surface thereof. The valve body 236 engages in the joint member 216 by bringing the threaded groove 238 of the valve body 236 into threaded engagement with an internally threaded surface 240 of the joint member 216. One end of the valve body 236 projects upwardly from the joint member 216, and a knob 242 is fitted over the projecting end of the valve body 236. The other end portion of the joint member 216 comprises a cylindrical portion 244 and a conical portion 246 extending axially from the end of the cylindrical portion 244 into the hole 232. An O-ring 248 is fitted in an annular groove defined in the outer peripheral surface of the cylindrical portion 244. As the valve body 236 is turned and axially moved by the knob 242, the amount of projection of the conical portion 246 into the hole 232 is adjusted to control the rate of flow of a fluid between the passage 228 and the hole 232.

As can readily be understood from FIG. 11, when the passage 228 and the hole 232 are held out of communication with each other, the packing member 234 is pressed radially inwardly by a fluid pressure to allow the fluid to flow from the portion of the chamber 222 below the packing member 234 past the packing member 234 into the portion of the chamber 222 above the packing member 234. Therefore, the passage 230 communicates with the passage 223 through the chamber 222 to permit the fluid to flow from the passage 230 through the chamber 222 and the passage 228 into the passage 226.

A fluid under pressure is prevented from flowing from the passage 228 past the packing member 234 into the passage 230. Denoted at 250 is a nut, 252 a gasket, and 254 an O-ring.

The components of the second control valve 212 are the same as those of the first control valve 210, and are designated by identical reference numerals with a suffix a and will not be described in detail.

The tube joint 200 will be described below. The tube joint 200 is substantially identical in construction to the tube joint 140 shown in FIG. 7. Those parts of the tube joint 200 which are identical to those of the tube joint 140 are denoted by identical reference numerals, and will not be described in detail.

A joint portion 256 is integrally formed with the base member 142 placed on the upper surface of the plate 208 of the speed controller 202. The joint portion 256 has recesses 258, 258a defined in a side thereof and in which the projecting portions 224, 224a of the body 206 are fitted, respectively. A bent passage 260 is defined in the joint portion 256 and the base member 142 in communication between the recess 258 and the opening 150 (see FIG. 11). the passage 260 therefore communicates with the passage 226 of the speed controller 202. The recess 258a communicates with the peripheral groove 184 of the holder member 168 through a passage 262 and also with the passage 226a of the speed controller 202 (see FIG. 12).

In operation, the other end of the double-walled tube assembly 100 is connected to the non-illustrated fluid source. Air under pressure is now supplied into the inner passage 106, for example, of the tube assembly 100. The air is then passed through the passage 88, the opening 150, the passage 260, and the passage 226 into the chamber 222. since the chamber 222 is sealed by the packing member 234, or a check valve, the air flows from the chamber 222 into the passage 228 and then the hole 232. Since the amount of opening of the hole 232 is adjusted by the valve body 236 through turning movement of the knob 242, the rate of flow of the air from the passage 228 into the hole 232 is controlled. The speed of displacement of the piston (not shown) of the cylinder 204 is thus adjusted.

Then, the air in the hole 232 flows through the stepped through hole 214 and the opening 213 into a first port (not shown) of the air cylinder 204 to displace the piston thereof in one direction. Air discharged under pressure from a second port (not shown) of the air cylinder 204 flows through the opening 213a into the hole 232a of the second control valve 212. The air is then introduced from the hole 232a via the passage 230a into the chamber 222a in which the air forces the packing member 234a radially inwardly. The air flows past the packing member 234a into the passage 228a and then the passage 226a, from which the air reaches the passage 262 of the tube joint 200. When the valve body 236a is in an upper position allowing communication between the hole 232a and the passage 228a, part of the air introduced into the hole 232a flows through the passage 228a into the chamber 222a. The air that has reached the chamber 262 is introduced through the peripheral groove 184 into the outer passage 108 of the tube assembly 100, from which the air is discharged.

The tube joint 200 operates in the same manner and offers the same advantages as the tube joints 140, 190 of the fourth and fifth embodiments of the present invention.

With the present invention, as described above, the partly spherical projection on the distal end of the coupling for being inserted into the inner tube of the double-walled tube assembly has a spherical surface. When the double-walled tube assembly is displaced with respect to the coupling under fluid pressure in the tube assembly upon a change in the pressure therein, or due to thermal expansion or shrinkage of the tube assembly upon a change in the temperature of the fluid, the inner peripheral surface of the inner tube is slidable against the outer peripheral surface of the joint including the partly spherical projection. Therefore, the inner peripheral surface of the inner tube is prevented from damage which would otherwise result from frictional engagement with the partly spherical projection.

The number of tube joints attached to the respective ports of a fluid-pressure-operated device and the number of tubes coupled to the tube joints are reduced as compared with conventional tube joints. Accordingly, the tubes can be attached highly easily, the danger of erroneous tube attachment is reduced, and so is the space required to attach the tubes.

Moreover, one of the tubes of the double-walled tube assembly is engaged and positioned by the body of the tube joint, and the holder member has an opening through which one of the passages of the tube assembly communicates with one passage in the body. As a consequence, the process of connecting the double-walled tube assembly is simplified, and can be carried out highly efficiently. Since the holder member has the opening through which the passage of the tube assembly communicates with the passage of the body, the number of passages in the body is reduced to make the tube joint smaller in size. Therefore, where a plurality of fluid-pressure-operated devices such as solenoid-operated valves are installed, the tubing system is simplified with a reduced number of tubes used.

Although certain preferred embodiments have been shown and described, it should be understood that many changes and modifications may be made therein without departing from the scope of the appended claims.

What is claimed is:

1. A tube joint for connecting a multi-walled tube assembly including a plurality of tubes defining a plurality of fluid passages to an object, said tube joint comprising a joint body having a hole for inserting the tube assembly therein and said joint body defining a plurality of passages such that there are as many passages as the number of the fluid passages, a tube connector mechanism for engaging all tubes of said tube assembly within said hole, and a coupling having a rod for being fitted into said tube assembly within said hole and a passage for communicating said tube assembly with one of said passages of said joint body, said rod having on a distal end thereof a substantially spherical projection projecting radially outwardly for being fitted in an inner surface of said tube assembly to connect said tube assembly to said coupling, said inner surface of said tube assembly and said rod being slidable with respect to each other.

2. A tube joint according to claim 1, wherein said coupling is detachably fitted in said joint body through engagement of a fitting portion of said coupling in one of said passages of said joint body.

3. A tube joint according to claim 1, wherein said coupling has a step on an outer periphery thereof for engaging an end of one of said tubes of the tube assembly when said rod is fitted into said one tube.

4. A tube joint according to claim 1, wherein said spherical projection has a plurality of slits extending axially of said rod.

5. A tube joint according to claim 1, further including a fixing member for retaining said coupling fitted in one of said passages of said joint body.

6. A tube joint according to claim 5, wherein said fixing member has an opening which provides communication between one of said passages of said tube assembly and one of said passages of said joint body.

7. A tube joint comprising a joint body having a hole for inserting therein all tubes of a multi-walled tube assembly including a plurality of tubes defining a plurality of fluid passages, said joint body having as many passages as the number of the fluid passages, and a holder member completely disposed within said hole and having a step engageable with an outer one of said tubes of said tube assembly for positioning said tube assembly and an opening for communicating one of said fluid passages of said tube assembly with one of said passages of said joint body.

8. A tube joint according to claim 7, wherein said holder member has a hole for inserting said tube assembly therein, said step being disposed at one end of said hole of the holder member for seating an outer one of said tubes of said tube assembly, said opening being arranged to communicate said one fluid passage defined between said outer one and an inner one of said tubes of said tube assembly with said one passage of said joint body.

9. A tube joint according to claim 7, wherein said holder member has an interior conical surface defined by a surface slanted radially inwardly from said step, and a hole communicating with said interior conical surface for insertion therein of a coupling or an inner one of said tubes of said tube assembly.

10. A tube joint according to claim 9, wherein said coupling is engaged by said holder member and disposed in said joint body, said coupling having a rod for being fitted in said inner tube of said tube assembly and a passage for communicating the fluid passage defined by said inner tube with said one passage of said joint body, said rod being arranged to be fitted into said inner tube to communicate said fluid passage defined by said inner tube with said one passage of said joint body when said tube assembly is inserted into said joint body.

11. A tube joint comprising a joint body having a hole for inserting therein a multi-walled tube assembly including a plurality of tubes defining a plurality of fluid passages, said joint body having as many passages as the number of the fluid passages, and a holder member completely disposed within said hole and having a step engageable with one of said tubes of said tube assembly for positioning said tube assembly and an opening for communicating one of said fluid passages of said tube assembly with one of said passages of said joint body, said holder member having an interior conical surface defined by a surface slanted radially inwardly from said step, and a hole communicating with said interior conical surface for insertion therein of a coupling of an inner one of said tubes of said tube assembly.

12. A tube joint according to claim 11, wherein said holder member has a hole for inserting said tube assembly therein, said step being disposed at one end of said hole of the holder member for seating an outer one of said tubes of said tube assembly, said opening being arranged to communicate said one fluid passage defined between said outer one and an inner one of said tubes of said tube assembly within said one passage of said joint body.

13. A tube joint according to claim 11, wherein said coupling is engaged by said holder member and disposed in said joint body, said coupling having a rod for being fitted in said inner tube of said tube assembly and a passage for communicating the fluid passage defined by said inner tube with said one passage of said joint body, said rod being arranged to be fitted into said inner tube to communicate said fluid passage defined by said inner tube with said one passage of said joint body when said tube assembly is inserted into said joint body.

* * * * *